OR 3,428,389
Feb. 18, 1969  D. E. JUDD  3,428,389
METALLURGICAL OPTICAL SEMI-OBJECTIVE OF 8.0X MAGNIFICATION
Filed April 1, 1966
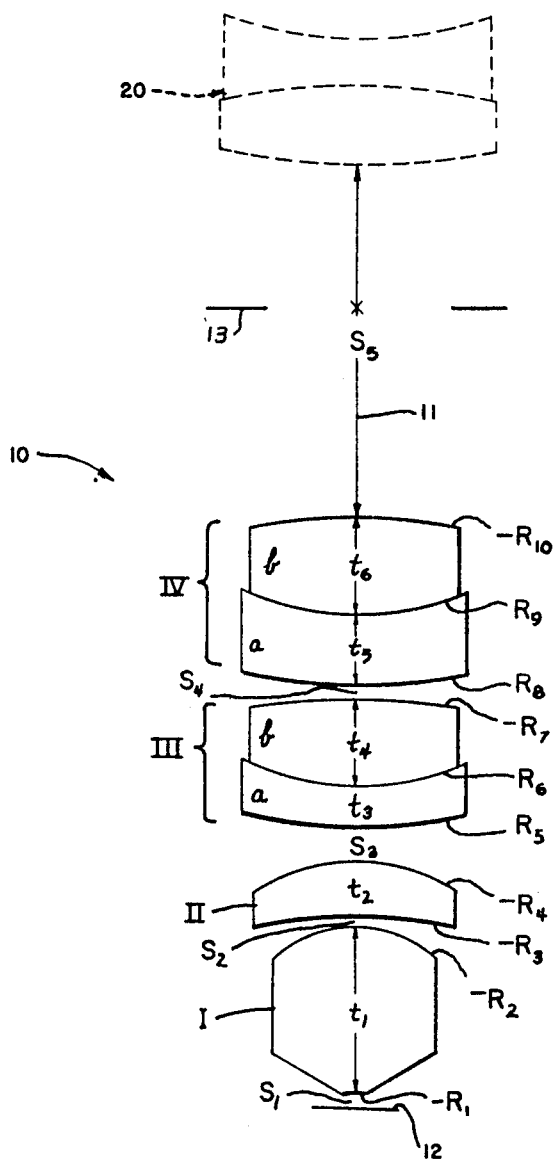
DUANE E. JUDD
INVENTOR.
BY Frank C. Parker
ATTORNEY

United States Patent Office 3,428,389
Patented Feb. 18, 1969

---

3,428,389
METALLURGICAL OPTICAL SEMI-OBJECTIVE OF 8.0× MAGNIFICATION
Duane E. Judd, Greece, N.Y., assignor to Bausch & Lomb Incorporated, Rochester, N.Y., a corporation of New York
Filed Apr. 1, 1966, Ser. No. 539,577
U.S. Cl. 350—177
Int. Cl. G02b 1/00
6 Claims The present invention relates to an optical objective for use on metallographs and the like and more particularly it relates to improvements therein.

Optical objectives of the kind generally described herebelow have been disclosed in a copending application of Harold E. Rosenberger, Ser. No. 408,875, filed Nov. 4, 1964, now abandoned in favor of continuation application Ser. No. 732,485, filed May 2, 1968, and having the same assignee, wherein is described in particular a superior microscope objective for use with biological specimens which are usually diascopically illuminated by transmitted light. It has been discovered that when such an objective is used in metallurgical microscopes where the specimen is reflective and opaque, specular light reflected from the specimen is degraded by the simultaneous ghost reflections caused by the vertical illuminator at the air-glass lens surfaces in the objective. Furthermore, anti-reflection coating when applied to said air-glass lens surfaces may reduce but does not eliminate the above-described difficulty.

In view of the foregoing statements, it is an object of the present invention to provide a microscope semi-objective of the kind described in the above-mentioned patent application having together with a 5× corrector lens substantially 40× overall magnification wherein ghost reflections from air-glass lens surfaces therein are either eliminated or are reduced to an innocuous condition.

It is a further object to provide such an objective having a very flat field and low distortion along with a superior degree of correction for astigmatism, coma and spherical image aberrations.

Further objects and advantages will be found in the arrangement and detailed structure of the parts of said objective by reference to the following specification and the accompanying drawing wherein the single figure is an optical diagram showing a preferred form of said invention.

The present microscope semi-objective per se is rated at 8.0× magnification and is designated in the drawing generally by the numeral 10. It is a member of a group of related metallographic semi-objectives having different magnification ratings which are interchangeably used in common with a single negative form corrector lens of 5× magnification as described in the aforementioned application of Rosenberger. Said corrector lens is designated by numeral 20 in the drawing and its magnification rating of 5×, when combined with the 8.0× magnification of the present semi-objective, produces a total magnification of 40.0× for the entire objective, and corrects certain aberrations in the imaging properties of said semi-objective in the same manner as recited in cited patent application of Rosenberger. Corrector lens 20 is located on the optical axis 11 of the semi-objective at a fixed distance $S_5$ rearwardly from the rear vertex of said semi-objective.

According to the present invention, the form and arrangement of the component lens members of said semi-objective 10 as well as the constructional details thereof are all so chosen that the aforesaid ghost reflections are reduced to an innocuous condition while coincidentally a good state of correction of image aberrations is achieved.

Comprised in said semi-objective 10 is a plurality of lens members which are optically aligned on an axis 11, and in foremost position is provided a positive meniscus singlet lens member designated I having a concave surface which faces an object surface 12 and is spaced therefrom at an axial distance designated $S_1$. The axial thickness of the members is comparatively thick and is designated $t_1$.

Rearwardly of member I is spaced a second singlet meniscus positive lens member designated II at a distance designated $S_2$, the concave side of which faces said object surface 12, and the axial thickness of the lens member is denoted by $t_2$.

Spaced rearwardly of lens member II at an axial distance $S_3$ is a positive doublet lens member designated III which is comprised of a front negative meniscus lens element IIIa. Against the rear surface of the lens element, is held a double convex lens element IIIb. The axial lens thicknesses of said lens elements IIIa and IIIb are $t_3$ and $t_4$ respectively.

Most rearwardly is located a second positive doublet lens member designated IV which is spaced at an axial distance designated $S_4$ from member III. Member IV is comprised of front negative meniscus lens element IVa having a rear concave surface against which a rear double convex lens element is held so as to form an interface.

A field diaphragm 13 having a diameter of substantially 1.6661F is provided at an axial distance of substantially 1.9505F rearwardly from the rear apex of lens member IV to improve the performance of said semi-objective wherein F represents the equivalent focal length of said semi-objective taken in combination with said corrector lens 20.

The constructional data for the semi-objective per se is given in Table I of values which are stated in terms of F herebelow, said values being entirely effective and practical in producing within the ranges stated an objective having superior performance. In the table the values are given for the successive lens radii $-R_1$ to $-R_{10}$ of the lens members I to IV, the minus (−) sign meaning that the centers of curvature of such surfaces lie on the object side thereof, the aforesaid lens thicknesses $t_1$ to $t_6$, air spaces $S_1$ to $S_5$, and equivalent focal lengths designated $F_I$ to $F_{IVb}$ of the successive lens members and elements I to IVb, the minus (−) sign used therewith meaning negative focal lengths, and additionally absolute values of the refractive indices $n_D(I)$ to $n_D(IVb)$ and Abbe numbers $\nu(I)$ to $\nu(IVb)$ which specify the glasses used in the aforesaid members and elements respectively are specified.

TABLE I $3.28F < F_I < 3.90F$
$4.58F < F_{II} < 4.85F$
$8.83F < F_{III} < 10.93F$
$9.67F < F_{IV} < 13.90F$
$4.70F < -F_{IIIa} < 4.80F$
$3.14F < F_{IIIb} < 3.36F$
$4.56F < -F_{IVa} < 4.93F$
$3.15F < F_{IVb} < 3.75F$
$1.51F < t_1 < 1.57F$
$.54F < t_2 < .75F$
$.31F < t_3 < .33F$
$.82F < t_4 < .88F$
$.04F < t_5 < .93F$
$.85F < t_6 < 1.02F$
$.10F < S_1 < .13F$
$.04F < S_2 < .12F$
$.35F < S_3 < .37F$
$.12F < S_4 < .21F$
$2.80F < S_5 < 3.40F$
$1.08F < -R_1 < 1.35F$
$1.15F < -R_2 < 1.17F$
$14.30F < -R_3 < 16.45F$
$2.09F < -R_4 < 2.15F$
$7.40F < R_5 < 7.70F$

TABLE I—Continued $2.30F < R_6 < 2.53F$
$4.70F < -R_7 < 5.92F$
$6.88F < R_8 < 9.24F$
$2.38F < R_9 < 2.40F$
$4.40F < -R_{10} < 8.10F$
$1.618 < n_D(I) < 1.622$
$1.512 < n_D(II) < 1.515$
$1.718 < n_D(IIIa) < 1.722$
$1.512 < n_D(IIIb) < 1.515$
$1.747 < n_D(IVa) < 1.751$
$1.512 < n_D(IVb) < 1.515$
$59.8 < \nu(I) < 60.8$
$69.5 < \nu(II) < 70.6$
$29.0 < \nu(IIIa) < 29.5$
$69.5 < \nu(IIIb) < 70.6$
$34.5 < \nu(IVa) < 36.0$
$69.5 < \nu(IVb) < 70.6$ More specifically, the values for the lens parameters which appear in Table I are given for one successful form of the present invention in Table II, the symbolism and meaning of the signs being the same in both tables.

TABLE II

| | |
|---|---|
| $F_I = 3.297F$ | $t_1 = 1.564F$ |
| $F_{II} = 4.840F$ | $t_2 = .548F$ |
| $F_{III} = 10.919F$ | $t_3 = .325F$ |
| $F_{IV} = 9.682F$ | $t_4 = .833F$ |
| $-F_{IIIa} = 4.719F$ | $t_5 = .670F$ |
| $F_{IIIb} = 3.350F$ | $t_6 = .914F$ |
| $-F_{IVa} = 4.592F$ | $S_1 = .122F$ |
| $F_{IVb} = 3.165F$ | $S_2 = .0406F$ |
| $-R_1 = 1.330F$ | $S_3 = .3657F$ |
| $-R_2 = 1.169F$ | $S_4 = .1219F$ |
| $-R_3 = 14.318F$ | $S_5 = 3.265F$ |
| $-R_4 = 2.146F$ | |
| $R_5 = 7.654F$ | |
| $R_6 = 2.311F$ | |
| $-R_7 = 5.914F$ | |
| $R_8 = 8.869F$ | |
| $R_9 = 2.398F$ | |
| $-R_{10} = 4.404F$ | |
| $n_D(I) = 1.620$ | $\nu(I) = 60.3$ |
| $n_D(IIIb) = 1.514$ | $\nu(II) = 70.0$ |
| $n_D(IIIa) = 1.720$ | $\nu(IIIa) = 29.3$ |
| $n_D = (IIIb) = 1.514$ | $\nu(IIIb) = 70.0$ |
| $n_D(IVa) = 1.749$ | $\nu(IVa) = 35.0$ |
| $n_D(IVb) = 1.514$ | $\nu(IVb) = 70.0$ |

Furthermore, the values for the lens parameters which define a second specific form of the invention are given in Table III herebelow:

TABLE III

| | |
|---|---|
| $F_I = 3.875F$ | $t_1 = 1.51F$ |
| $F_{II} = 4.747F$ | $t_2 = .59F$ |
| $F_{III} = 9.055F$ | $t_3 = .32F$ |
| $F_{IV} = 11.814F$ | $t_4 = .82F$ |
| $-F_{IIIa} = 4.789F$ | $t_5 = .04F$ |
| $F_{IIIb} = 3.194F$ | $t_6 = .85F$ |
| $-F_{IVa} = 4.579F$ | $S_1 = .10F$ |
| $F_{IVb} = 3.300F$ | $S_2 = .07F$ |
| $-R_1 = 1.07F$ | $S_3 = .36F$ |
| $-R_2 = 1.15F$ | $S_4 = .12F$ |
| $-R_3 = 14.43F$ | $S_5 = 2.81F$ |
| $-R_4 = 2.09F$ | |
| $R_5 = 7.40F$ | |
| $R_6 = 2.30F$ | |
| $-R_7 = 4.71F$ | |
| $R_8 = 6.89F$ | |
| $R_9 = 2.39F$ | |
| $-R_{10} = 5.05F$ | |

TABLE III—Continued

| | |
|---|---|
| $n_D(I) = 1.620$ | $\nu(I) = 60.3$ |
| $n_D(II) = 1.513$ | $\nu(II) = 70.08$ |
| $n_D(IIIa) = 1.720$ | $\nu(IIIa) = 29.3$ |
| $n_D(IIIb) = 1.513$ | $\nu(IIIb) = 70.08$ |
| $n_D(IVa) = 1.749$ | $\nu(IVa) = 35.8$ |
| $n_D(IVb) = 1.513$ | $\nu(IVb) = 70.08$ |

A still further specific form of semi-objective which is exemplary of the present invention is defined by the values given in Table IV herebelow:

TABLE IV

| | |
|---|---|
| $F_I = 3.317F$ | $t_1 = 1.57F$ |
| $F_{II} = 4.593F$ | $t_2 = .75F$ |
| $F_{III} = 8.848F$ | $t_3 = .32F$ |
| $F_{IV} = 13.897F$ | $t_4 = .88F$ |
| $-F_{IIIa} = 4.721F$ | $t_5 = .92F$ |
| $F_{IIIb} = 3.154F$ | $t_6 = 1.02F$ |
| $-F_{IVa} = 4.916F$ | $S_1 = .12F$ |
| $F_{IVb} = 3.735F$ | $S_2 = .13F$ |
| $-R_1 = 1.35F$ | $S_3 = .36F$ |
| $-R_2 = 1.17F$ | $S_4 = .21F$ |
| $-R_3 = 16.45F$ | $S_5 = 3.40F$ |
| $-R_4 = 2.11F$ | $n_D(I) = 1.620$ |
| $R_5 = 7.69F$ | $n_D(II) = 1.513$ |
| $R_6 = 2.52F$ | $n_D(IIIa) = 1.720$ |
| $-R_7 = 4.95F$ | $n_D(IIIb) = 1.513$ |
| $R_8 = 9.24F$ | $n_D(IVa) = 1.749$ |
| $R_9 = 2.40F$ | $n_D(IVb) = 1.513$ |
| $-R_{10} = 8.10F$ | $\nu(I) = 60.3$ |
| | $\nu(II) = 70.08$ |
| | $\nu(IIIa) = 29.3$ |
| | $\nu(IIIb) = 70.08$ |
| | $\nu(IVa) = 35.8$ |
| | $\nu(IVb) = 70.08$ |

From the foregoing description, it will be apparent that a semi-objective of 8.0× per se is provided which is capable of high quality optical performance and additionally it is produceable by comparatively low-cost manufacturing operations involving mostly low curvature lens surfaces.

Although only certain forms of the present invention have been shown and described in detail, other forms are possible and changes and substitutions may be made therein within the aforementioned limits without departing from the spirit of the invention.

I claim:
1. A microscope semi-objective having a combined positive power of 40× and a numerical aperture of 0.65 when used with a rearwardly aligned corrector lens of 5× magnification, said semi-objective comprising
   a front singlet lens member designated I of positive meniscus form which is concave toward an object surface on which said semi-objective is focused, member I being spaced an axial distance designated $S_1$ from said surface and having an axial thickness designated $t_1$,
   a second singlet lens member designated II of positive meniscus form which is concave toward the front, member II being spaced at an axial distance designated $S_2$ rearwardly from member I and having an axial thickness designated $t_2$,
   a front doublet lens member designated III which is spaced at an axial distance denoted $S_3$ rearwardly of member II, said member including a front convex-concave lens element designated IIIa which joins along an interface a rear double convex lens element designated IIIb, the axial thickness of said elements being designated $t_3$ and $t_4$ respectively,
   a rear doublet lens member designated IV which is spaced at an axial distance denoted $S_4$ rearwardly of member III, said member including a front convex-concave lens element designated IVa which joins along an interface a rear double convex lens element designated IV$b$, the axial thicknesses of said elements being designated $t_5$ and $t_6$ respectively, the values for the lens parameters constituting said semi-objective being given in the table of mathematical statements herebelow wherein $F_I$ to $F_{IV}$ represents the equivalent focal lengths of the successive lens members I to IV respectively, and further including the values for the aforesaid lens thicknesses $t_1$ to $t_6$ and axial air spaces $S_1$ to $S_5$, said values being given in terms of F which represents the equivalent focal length of said semi-objective taken together with said corrector lens, $$3.28F < F_I < 3.90F$$
$$4.58F < F_{II} < 4.85F$$
$$8.83F < F_{III} < 10.93F$$
$$9.67F < F_{IV} < 13.90F$$
$$1.51F < t_1 < 1.57F$$
$$.54F < t_2 < .75F$$
$$.31F < t_3 < .33F$$
$$.82F < t_4 < .88F$$
$$.04F < t_5 < .93F$$
$$.85F < t_6 < 1.02F$$
$$.10F < S_1 < .13F$$
$$.04F < S_2 < .12F$$
$$.35F < S_3 < .37F$$
$$.12F < S_4 < .21F$$
$$2.80F < S_5 < 3.40F$$

| | |
|---|---|
| $1.618 < n_D(I) < 1.622$ | $59.8 < \nu(I) < 60.8$ |
| $1.512 < n_D(II) < 1.515$ | $69.5 < \nu(II) < 70.6$ |
| $1.718 < n_D(IIIa) < 1.722$ | $29.0 < \nu(IIIa) < 29.5$ |
| $1.512 < n_D(IIIb) < 1.515$ | $69.5 < \nu(IIIb) < 70.6$ |
| $1.747 < n_D(IVa) < 1.751$ | $34.5 < \nu(IVa) < 36.0$ |
| $1.512 < n_D(IVb) < 1.515$ | $69.5 < \nu(IVb) < 70.6$ | wherein I to IV$b$ represent the successive lens elements of said semi-objective, and $n_D$ and $\nu$ designate respectively the refractive index and Abbe number of the glasses from which said elements are formed, the values thereof being absolute quantities.

2. A microscope semi-objective as set forth in claim 1 further characterized by said lens elements III$a$, III$b$, IV$a$ and IV$b$ having values of equivalent focal lengths designated $-F_{IIIa}$, $F_{IIIb}$, $-F_{IVa}$ and $F_{IVb}$ respectively, as set forth in the table of mathematical statements herebelow in terms of F which represents the equivalent focal length of said semi-objective combined with said corrector lens, the minus (—) sign meaning that such focal lengths are negative, $$4.70F < -F_{IIIa} < 4.80F$$
$$3.14F < F_{IIIb} < 3.36F$$
$$4.56F < -F_{IVa} < 4.93F$$
$$3.15F < F_{IVb} < 3.75F$$

3. A microscope semi-objective having a combined positive power of 40× and a numerical aperture of 0.65 when used with a rearwardly aligned corrector lens of 5× magnification, said semi-objective comprising a front singlet lens member designated I of positive meniscus form which is concave toward an object surface on which said semi-objective is focused, member I being spaced an axial distance designated $S_1$ from said surface and having an axial thickness designated $t_1$, a second singlet lens member designated II of positive meniscus form which is concave toward the front, member II being spaced at an axial distance designated $S_2$ rearwardly from member I and having an axial thickness designated $t_2$, a front doublet lens member designated III which is spaced at an axial distance denoted $S_3$ rearwardly of member II, said member including a front convex-concave lens element designated III$a$ which joins along an interface a rear double convex lens element designated III$b$, the axial thicknesses of said elements being designated $t_3$ and $t_4$ respectively, a rear doublet lens member designated IV which is spaced at an axial distance denoted $S_4$ rearwardly of member III, said member including a front convex-concave lens element designated IV$a$ which joins along an interface a rear double convex lens element designated IV$b$, the axial thicknesses of said elements being designated $t_5$ and $t_6$ respectively, the values for the lens parameters of said semi-objective being given in the table of mathematical statements herebelow wherein $-R_1$ to $-R_{10}$ represent the radii of the successive lens surfaces of lens members I to IV, the minus (—) sign meaning that the centers of curvature of such surfaces lie on the object side thereof, said table further including the values for the aforesaid thicknesses $t_1$ to $t_6$ and air spaces $S_1$ to $S_5$, all of which values are given in terms of F which represents the equivalent focal length of said semi-objective in combination with said corrector lens, $$1.08F < -R_1 < 1.35F$$
$$1.15F < -R_2 < 1.17F$$
$$14.30F < -R_3 < 16.45F$$
$$2.09F < -R_4 < 2.15F$$
$$7.40F < R_5 < 7.70F$$
$$2.30F < R_6 < 2.53F$$
$$4.70 < -R_7 < 5.92F$$
$$6.88F < R_8 < 9.24F$$
$$2.38F < R_9 < 2.40F$$
$$4.40F < -R_{10} < 8.10F$$
$$1.51F < t_1 < 1.57F$$
$$.54F < t_2 < .75F$$
$$.31F < t_3 < .33F$$
$$.82F < t_4 < .88F$$
$$.04F < t_5 < .93F$$
$$.85F < t_6 < 1.02F$$
$$.10F < S_1 < .13F$$
$$.04F < S_2 < .12F$$
$$.35F < S_3 < .37F$$
$$.12F < S_4 < .21F$$
$$2.80F < S_5 < 3.40F$$

| | |
|---|---|
| $1.618 < n_D(I) < 1.622$ | $59.8 < \nu(I) < 60.8$ |
| $1.512 < n_D(II) < 1.515$ | $69.5 < \nu(II) < 70.6$ |
| $1.718 < n_D(IIIa) < 1.722$ | $29.0 < \nu(IIIa) < 29.5$ |
| $1.512 < n_D(IIIb) < 1.515$ | $69.5 < \nu(IIIb) < 70.6$ |
| $1.747 < n_D(IVa) < 1.751$ | $34.5 < \nu(IVa) < 36.0$ |
| $1.512 < n_D(IVb) < 1.515$ | $69.5 < \nu(IVb) < 70.6$ | wherein I to IV$b$ represent the successive lens elements of said semi-objective, and $n_D$ and $\nu$ designate respectively the refractive index and Abbe number of the glasses whereof said elements are formed, the values thereof being absolute quantities.

4. A microscopic semi-objective having a combined positive power of 40× and a numerical aperture of 0.65 when used with a rearwardly aligned corrector lens of 5× magnification, said semi-objective comprising a front singlet lens member designated I of positive meniscus form which is concave toward an object surface on which said semi-objective is focused, member I being spaced an axial distance designated $S_1$ from said surface and having an axial thickness designated $t_1$, a second singlet lens member designated II of positive meniscus form which is concave toward the front, member II being spaced at an axial distance designated $S_2$ rearwardly from member I and having an axial thickness designated $t_2$, a front doublet lens member designated III which is spaced at an axial distance denoted $S_3$ rearwardly of member II, said member including a front convex-concave lens element designated III$a$ which joins along an interface a rear double convex lens element designated III$b$, the axial thicknesses of said elements being designated $t_3$ and $t_4$ respectively, a rear doublet lens member designated IV which is spaced at an axial distance denoted $S_4$ rearwardly of member III, said member including a front convex-concave lens element designated IVa which joins along an interface a rear double convex lens element designated IVb, the axial thicknesses of said elements being designated $t_5$ and $t_6$ respectively, the specific values for the lens parameters for one form of said semi-objective being given substantially in the table herebelow wherein $F_1$ to $F_{IVb}$ represent the equivalent focal lengths of the aforesaid lens members and elements I to IVb respectively, the minus (—) sign denoting negative focal lengths, the table further including the specific values substantially for the aforesaid lens thicknesses $t_1$ to $t_6$ and the successive air spaces $S_1$ to $S_5$, said values being stated in terms of F which represents the combined focal length of said semi-objective and corrector lens together, the specific absolute values furthermore being given substantially for the refractive indices $n_D(I)$ to $n_D(IVb)$ and Abbe numbers $\nu(I)$ to $\nu(IVb)$, $F_I = 3.297F$  $n_D(I) = 1.620$
$F_{II} = 4.840F$  $n_D(II) = 1.514$
$F_{III} = 10.919F$  $n_D(IIIa) = 1.720$
$F_{IV} = 9.682F$  $n_D(IIIb) = 1.514$
$-F_{IIIa} = 4.719F$  $n_D(IVa) = 1.749$
$F_{IIIb} = 3.350F$  $n_D(IVb) = 1.514$
$-F_{IVa} = 4.592F$  $\nu(I) = 60.3$
$F_{IVb} = 3.165F$  $\nu(II) = 70.0$
$t_1 = 1.564F$  $\nu(IIIa) = 29.3$
$t_2 = .548F$  $\nu(IIIb) = 70.0$
$t_3 = .325F$  $\nu(IVa) = 35.0$
$t_4 = .833F$  $\nu(IVb) = 70.0$
$t_5 = .670F$
$t_6 = .914F$
$S_1 = .122F$
$S_2 = .0406F$
$S_3 = .3657F$
$S_4 = .1219F$
$S_5 = 3.265F$ 5. A microscope semi-objective having a combined positive power of 40× and a numerical aperture of 0.65 when used with a rearwardly aligned corrector lens of 5× magnification, said semi-objective comprising a front singlet lens member designated I of positive meniscus form which is concave toward an object surface on which said semi-objective is focused, member I being spaced an axial distance designated $S_1$ from said surface and having an axial thickness designated $t_1$, a second singlet lens member designated II of positive meniscus form which is concave toward the front, member II being spaced at an axial distance designated $S_2$ rearwardly from member I and having an axial thickness designated $t_2$.

a front doublet lens member designated III which is spaced at an axial distance denoted $S_3$ rearwardly of member II, said member including a front convex-concave lens element designated IIIa which joins along an interface a rear double convex lens element designated IIIb, the axial thicknesses of said elements being designated $t_3$ and $t_4$ respectively, a rear doublet lens member designated IV which is spaced at an axial distance denoted $S_4$ rearwardly of member III, said member including a front convex-concave lens element designated IVa which joins along an interface a rear double convex lens element designated IVb, the axial thicknesses of said elements being designated $t_5$ and $t_6$ respectively, the specific values for the lens parameters for one form of said semi-objective being given substantially in the table herebelow wherein $-R_1$ to $-R_{10}$ represent the radii of the successive lens surfaces of lens members I to IV, the minus (—) sign used with certain designations meaning that the centers of curvature of such surfaces lie on the object side thereof, the table further including the specific values substantially for the aforesaid lens thicknesses $t_1$ to $t_6$ and air spaces $S_1$ to $S_5$, all of which are given in terms of F which represents the equivalent focal length of the semi-objective combined with said corrector lens, the specific absolute values furthermore being given for the refractive indices $n_D(I)$ to $n_D(IVb)$ and the Abbe numbers $\nu(I)$ to $\nu(IVb)$ of the glasses used in the successive lens members and elements, $F_I = 3.875F$  $t_1 = 1.51F$
$F_{II} = 4.747F$  $t_2 = .59F$
$F_{III} = 9.055F$  $t_3 = .32F$
$F_{IV} = 11.814F$  $t_4 = .82F$
$-F_{IIIa} = 4.789F$  $t_5 = .04F$
$F_{IIIb} = 3.194F$  $t_6 = .85F$
$-F_{IVa} = 4.579F$  $S_1 = .10F$
$F_{IVb} = 3.300F$  $S_2 = .07F$
$-R_1 = 1.07F$  $S_3 = .36F$
$-R_2 = 1.15F$  $S_4 = .12F$
$-R_3 = 14.43F$  $S_5 = 2.81F$
$-R_4 = 2.09F$  $n_D(I) = 1.620$
$R_5 = 7.40F$  $n_D(II) = 1.513$
$R_6 = 2.30F$  $n_D(IIIa) = 1.720$
$-R_7 = 4.71F$  $n_D(IIIb) = 1.513$
$R_8 = 6.89F$  $n_D(IVa) = 1.749$
$R_9 = 2.39F$  $n_D(IVb) = 1.513$
$-R_{10} = 5.05F$  $\nu(I) = 60.3$
 $\nu(II) = 70.08$
 $\nu(IIIa) = 29.3$
 $\nu(IIIb) = 70.08$
 $\nu(IVa) = 35.8$
 $\nu(IVb) = 70.08$ 6. A microscope semi-objective having a combined positive power of 40× and a numerical aperature of 0.65 when used with a rearwardly aligned corrector lens of 5× magnification, said semi-objective comprising a front singlet lens member designated I of positive meniscus form which is concave toward an object surface on which said semi-objective is focused, member I being spaced an axial distance designated $S_1$ from said surface and having an axial thickness designated $t_1$, a second singlet lens member designated II of positive meniscus form which is concave toward the front, member II being spaced at an axial distance designated $S_2$ rearwardly from member I and having an axial thickness designated $t_2$, a front doublet lens member designated III which is spaced at an axial distance denoted $S_3$ rearwardly of member II, said member including a front convex-concave lens element designated IIIa which joins along an interface a rear double convex lens element designated IIIb, the axial thicknesses of said elements being designated $t_3$ and $t_4$ respectively, a rear doublet lens member designated IV which is spaced at an axial distance denoted $S_4$ rearwardly of member III, said member including a front convex-concave lens element designated IVa which joins along an interface a rear double convex lens element designated IVb, the axial thicknesses of said elements being designated $t_5$ and $t_6$ respectively, the specific values for the lens parameters for one form of said semi-objective being given substantially in the table herebelow wherein $-R_1$ to $-R_{10}$ represent the radii of the successive lens surfaces of lens members I to IV, the minus (—) sign used with certain designations meaning that the centers of curvature of such surfaces lie on the object side thereof, the table further including the specific values substantially for the aforesaid lens thicknesses $t_1$ to $t_6$ and air spaces $S_1$ to $S_5$, all of which are given in terms of F which represents the equivalent focal length of the semi-objective combined with said corrector lens, the specific absolute values furthermore being given for the refractive indices $n_D(I)$ to $n_D(IVb)$ and the Abbe numbers $\nu(I)$ to $\nu(IVb)$ of the glasses used in the successive lens members and elements, $F_I = 3.317F$
$F_{II} = 4.593F$
$F_{III}\text{—}8.848F$
$F_{IV} = 13.897F$
$-F_{IIIa} = 4.721F$
$F_{IIIb} = 3.154F$
$-F_{IVa} = 4.916F$
$F_{IVb} = 3.735F$
$-R_1 = 1.35F$
$-R_2 = 1.17F$
$-R_3 = 16.45F$
$-R_4 = 2.11F$ $t_1 = 1.57F$
$t_2 = .75F$
$t_3 = .32F$
$t_4 = .88F$
$t_5 = .92F$
$t_6 = 1.02F$
$S_1 = .12F$
$S_2 = .13F$
$S_3 = .36F$
$S_4 = .21F$
$S_5 = 3.40F$
$n_D(I) = 1.620$ $R_5 = 7.69F$
$R_6 = 2.52F$
$-R_7 = 4.95F$
$R_8 = 9.24F$
$R_9 = 2.40F$
$-R_{10} = 8.10F$ $n_D(II) = 1.513$
$n_D(IIIa) = 1.720$
$n_D(IIIb) = 1.513$
$n_D(IVa) = 1.749$
$n_D(IVb) = 1.513$
$\nu(I) = 60.3$
$\nu(II) = 70.08$
$\nu(IIIa) = 29.3$
$\nu(IIIb) = 70.08$
$\nu(IVa) = 35.8$
$\nu(IVb) = 70.08$

References Cited

UNITED STATES PATENTS 3,118,964   1/1964   Buzawa _____ 350—177

JOHN K. CORBIN, *Primary Examiner.*

U.S. Cl. X.R.

350—207, 216, 220